United States Patent [19]
Beller et al.

[11] Patent Number: 6,046,712
[45] Date of Patent: Apr. 4, 2000

[54] HEAD MOUNTED COMMUNICATION SYSTEM FOR PROVIDING INTERACTIVE VISUAL COMMUNICATIONS WITH A REMOTE SYSTEM

[75] Inventors: William E. Beller; Timothy P. O'Hagan, both of Akron, Ohio

[73] Assignee: Telxon Corporation, Akron, Ohio

[21] Appl. No.: 08/685,395

[22] Filed: Jul. 23, 1996

[51] Int. Cl.[7] ...................................................... G09G 5/00
[52] U.S. Cl. .................................... 345/8; 345/7; 348/13; 348/14; 348/207
[58] Field of Search ............................ 345/7, 8; 348/13, 348/14, 15, 115, 207, 211, 552; 340/505, 286.01, 506; 379/34, 35

[56] References Cited

U.S. PATENT DOCUMENTS

| | | | |
|---|---|---|---|
| 4,884,219 | 11/1989 | Waldren | 364/514 |
| 5,162,828 | 11/1992 | Furness et al. | 353/122 |
| 5,322,441 | 6/1994 | Lewis et al. | 434/307 |
| 5,491,510 | 2/1996 | Gove | 348/77 |
| 5,572,204 | 11/1996 | Timm et al. | 340/988 |
| 5,577,981 | 11/1996 | Jarvik | 482/4 |
| 5,579,026 | 11/1996 | Tabata | 345/8 |
| 5,596,340 | 1/1997 | Otomi | 345/31 |
| 5,619,183 | 4/1997 | Ziegra et al. | 340/505 |

*Primary Examiner*—Julie Lieu
*Attorney, Agent, or Firm*—Amin & Eschweiler, L.L.P.

[57] ABSTRACT

A head mounted communication system provides interactive visual and audio communications between a user of the head mounted system and an operator of a remote system. The head mounted system includes a camera to pick up an image within the user's field of view. A display and optics are provided for projecting an enlarged image of displayed information at a distance from the user so as to be superimposed on the user's view of the real world. The system also includes a transmitter and receiver for providing two-way wireless communication between the head mounted system and the remote system so as to allow the operator of the remote system to see what the user of the head mounted system is viewing and to allow the user of the head mounted system to view via the display and optics video inputs received from the remote system so that they appear to be superimposed upon the real world.

43 Claims, 6 Drawing Sheets

HEAD MOUNTED COMMUNICATION SYSTEM FOR PROVIDING INTERACTIVE VISUAL COMMUNICATIONS WITH A REMOTE SYSTEM

FIELD OF INVENTION

The present invention relates to a head mounted display system and more particularly to a head mounted communication system for providing interactive visual and/or audio communications between a user of the head mounted system and an operator of a remote system. The present invention allows the operator of the remote system to see what the user of the head mounted system is viewing and it allows the user of the head mounted system to view video inputs received from the remote system so that they appear to be superimposed upon the real world.

BACKGROUND OF THE INVENTION

Head mounted display systems such as shown in U.S. Pat. No. 5,162,828 are known for displaying video information including text, wherein the optics of the system enlarge the displayed video information and project it at a distance from the user. These head mounted display systems may be fully immersive such that the user cannot see the real world when the system is operating. Alternatively, these systems may project the displayed information so that it appears to be superimposed upon the real world by utilizing a monocular optical system or partially reflective optics through which the user can view the world. These head mounted display systems can be coupled to a hand held computer with a CD ROM drive or the like to display large amounts of information to the user. This can be an extremely helpful tool for people doing equipment maintenance and repair work. When such a system is also used with a portable telephone, the user can gain assistance from a supervisor or the like located remotely from the repair site. Although such a set-up is advantageous, it does not provide hands-free operation. Thus, the user is generally not free to use his hands for repair while he is communicating with the remote assistant. Further, if the user is unable to verbally communicate the precise details of a situation, the supervisor will not have a clear idea of what the problem is. This may prevent the supervisor from being able to offer assistance or it may result in the supervisor providing wrong instructions.

SUMMARY OF THE INVENTION

In accordance with the present invention, the disadvantages of prior head mounted display systems have been overcome. The head mounted communication system of the present invention provides interactive visual as well as audio communication between a user of the head mounted system and an operator of a remote system to allow the operator of the remote system to see what the user of the head mounted system is viewing and to allow the user of the head mounted system to view inputs received from the remote system so that they appear to be superimposed upon the real world.

More particularly, the present invention provides a means of communication between a user of the head mounted system and a remote system having a display and being capable of receiving data from the head mounted system and transmitting data to the head mounted system. The head mounted communication system includes a support to be worn on a user's head and a camera system that is mounted on the support to pick up an image within at least a portion of the user's field of view. A display is also mounted on the support with optics for projecting an enlarged image of displayed information at a distance from the user and superimposed on the user's view of the real world. A transmitter and receiver provide for wireless two-way communication between the head mounted system and the remote system. A controller is responsive to signals representing an image picked up by the camera system for controlling the transmission of data, representing the picked up image, to the remote system for display of the image on the remote system's display. The controller is also responsive to the receipt of video data from the remote system, representing at least in part additional information input at the remote system, for controlling the user's display to display the additional information wherein the optics project an image of the information so that it appears to be superimposed on the user's view of the real world.

In accordance with one embodiment of the present invention, the operator of the remote system can see the changing view of the user of the head mounted system in real time. The operator can add marks or other inputs to the real time image depicted on his display so as to identify, for example, a particular object within the picked up image of the real world. These marks can then be transmitted to the head mounted system in real time. Because the image projected by the user's display and optics of the head mounted system is at a known location with respect to the image of the real world, the two images can be correlated. Thus, data representing the marks input by the operator can be transmitted in association with a location determined with respect to the picked up image. The controller of the head mounted display system upon receipt of this transmitted data offsets the location of the marks on the user's display. Thus when projected, the marks identify the same real world objects viewed through the optics as the real world objects identified by the marks on the image picked up by the camera and depicted on the operator's remote system display. This process is dependent, however, on the user of the head mounted system maintaining his head stationary or realigning his head to a known location.

In accordance with another embodiment of the present invention, the operator of the remote system can transmit back to the head mounted display the entire image depicted on the operator's display, i.e. for example the picked up image modified with the operator's marks thereon. Although this embodiment requires more data to be transmitted back to the user's head mounted system, the user does not need to maintain his head stationary to determine what real world objects the operator's marks are identifying. Further, the user can easily realign his view to the view of the picked up image marked by the assistant by merely moving his head until the user's displayed image coincides with the real world image seen through the optics of the system. When the user's view is thus realigned, he can indicate this to the operator of the remote system. The operator then needs only to transmit added marks and their locations to the user as discussed above. It is noted that if the inputs from the operator are not required to be at a precise location with respect to the real world viewed by the user, the remote system need only transmit data representing the inputs without location information.

In accordance with another feature of the present invention, the head mounted communication system receives data representing displayable information from one or more non-remote data sources. An input device is actuable by the user to provide a user input command for selecting, for display on the head mounted display screen, data received from the remote system and the non-remote data sources. The controller is responsive to the user input command for controlling the head mounted display to display information from the remote system and non-remote data sources simultaneously or individually, in accordance with the command.

In a preferred embodiment, the head mounted communication system also includes an earphone or speaker and an audio pick up device such as a microphone or boom to provide one-way or two-way audio communication between the head mounted system and the remote system as well as two-way video communication therebetween. These and other advantages and novel features of the present invention, as well as details of an illustrated embodiment thereof, will be more fully understood from the following description and drawings.

DESCRIPTION OF THE PREFERRED EMBODIMENT

Figure 1:
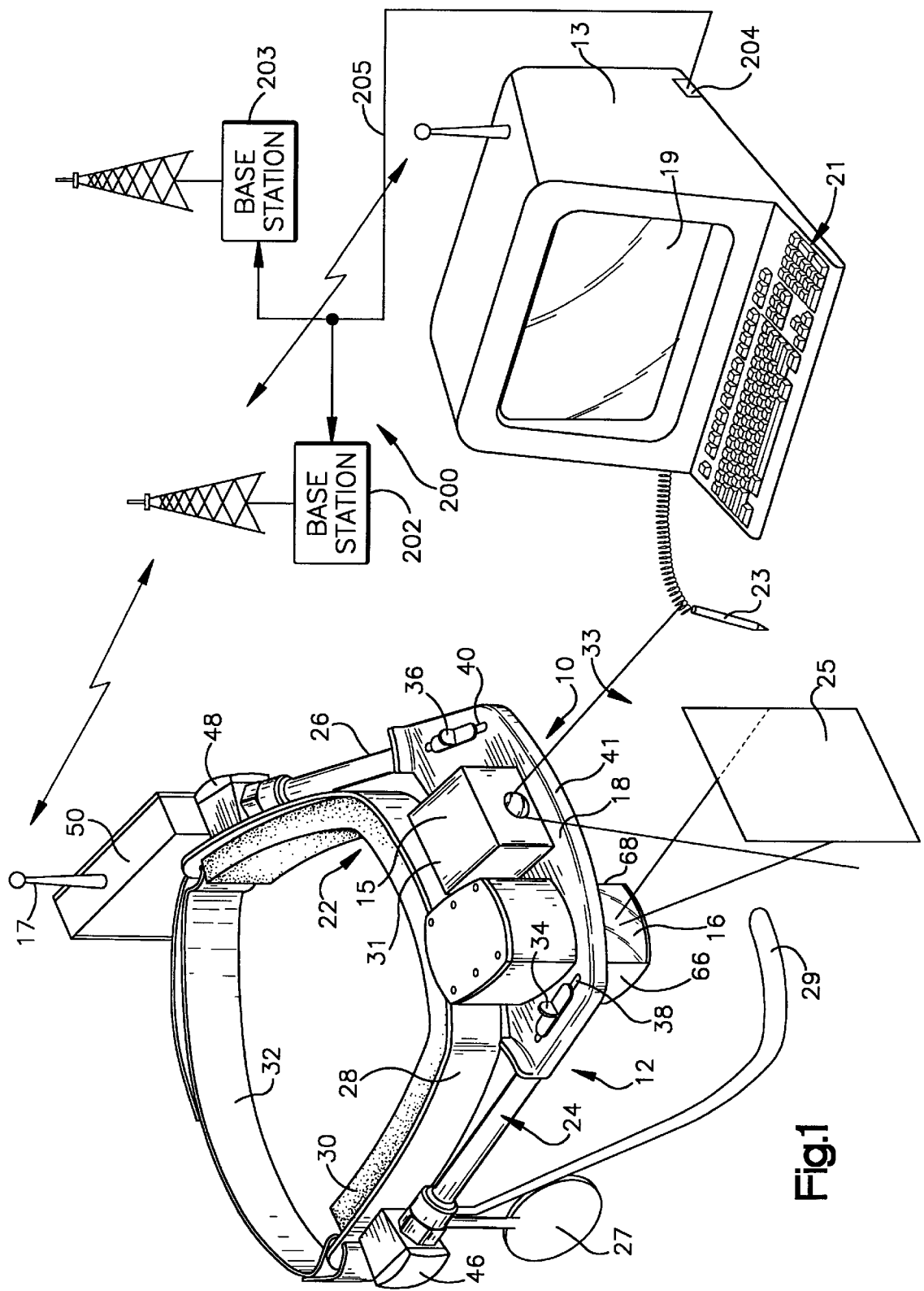
FIG. 1 is a perspective view of a head mounted system in communication with a remote assistant's terminal in accordance with the present invention.

A head mounted communication system 10 is shown in FIG. 1 in wireless communication with a remote assistant's terminal 13 so as to allow interactive visual and/or audio communications between the two systems 10 and 13. The head mounted communication system 10 includes a camera system 15 to pick up an image within at least a portion of the field of view of the user of the system 10. Data representing the image picked up by the camera system 15 is transmitted by wireless communication to the remote assistant's terminal 13.

The remote assistant's terminal 13 is responsive to the receipt of video data from the head mounted communication system 10 for displaying the received video information on a display 19 so that an operator of the terminal 13 can see at least a portion of the field of view of the user of the head mounted system 10 as picked up by the camera 15. The operator of the terminal 13 can enter data to be transmitted back to the head mounted system 10 for display thereat by operating a keyboard 21 or by utilizing a stylus 23. For example, the keyboard 21 may be utilized to enter text or to position various icons so that they are displayed at a desired location on the picked up image depicted on the display 19. Preferably, the display 19 includes a touch responsive panel or the like so that a stylus 23 can be used therewith to allow the assistant to mark the display by drawing circles, arrows, etc., that are useable to identify objects within the displayed image. The touch panel and associated processor within the terminal 13 are responsive to contact by the stylus 23 so as to control the display 19 to cause a visual representation of the marks to be generated on the display as if they were drawn by the stylus 23 in a manner that is well-known.

By inputting various commands to the terminal 13 the operator can control the terminal to transmit to the head mounted system 10 the information that he enters via the keyboard 21 and/or stylus 23 along with the location thereof with respect to the picked up image portrayed on the display 19. If the location of the entered inputs are not important, then the terminal 13 need only transmit data representing the input information alone. The operator can also control the terminal 13 to transmit the entire image depicted on the display 19 such that it includes, for example, both the picked up image as well as the additional information added thereto by the user utilizing the keyboard 21 and/or stylus 23.

Figure 2:
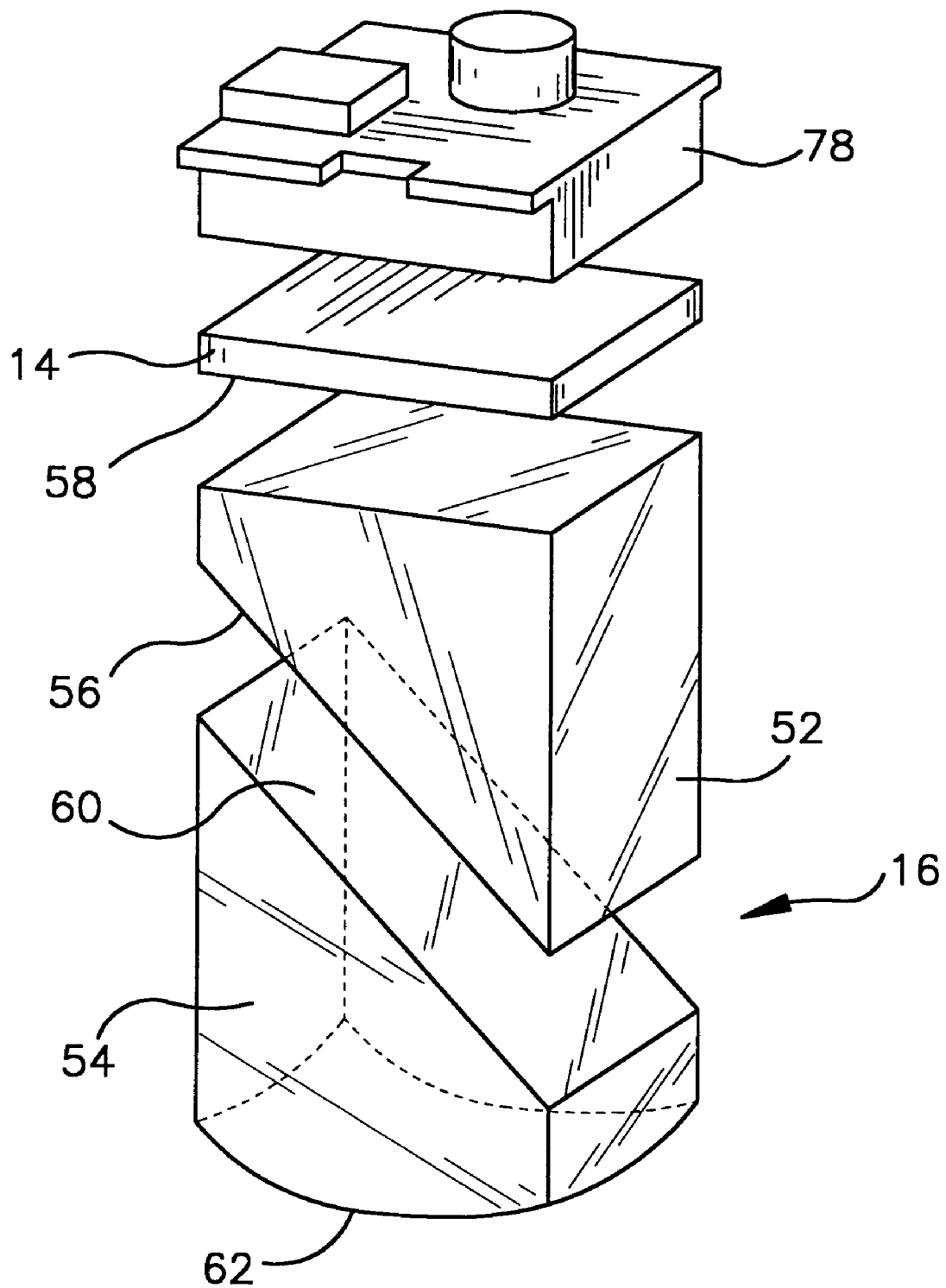
FIG. 2 is an exploded view of the display and optics of the head mounted communication system of FIG. 1.

The head mounted system 10 includes a liquid crystal display 14 or the like and associated optics 16 in order to display and project an image of the visual information received from the remote assistant's terminal 13. More particularly, the head mounted communication system 10 as shown in FIGS. 1 and 2 includes a frame 12 for supporting the display 14 and associated optics 16. The optics 16 may take the form of a solid block optical element as shown although it is apparent that other optical systems can be employed as well. The optical element 16 projects an enlarged image 25 of the information depicted on the display so that the image appears to be located at a distance from the user that may be infinity or less than infinity depending upon the application for which the system 10 is worn. Further, as discussed in detail below, the optical element 16 is preferably semi-transparent so that the projected image 25 appears to be superimposed on the real world, a portion of which is viewed by the user through the optical element 16. This portion of the user's field of view preferably forms a portion of the image picked up by the camera 15.

The frame 12 of the head mounted communication system 10 includes a central support 18 on which the camera 15, display 14 and optical element 16 are mounted so that the optical element 16 is in the direct line of sight of one of the user's eyes and the camera 15 picks up at least a portion of the user's field of view of that one eye. Also mounted on the frame 12 is an antenna 17 forming part of a radio wireless communication system as discussed in detail below. The central support 18 is coupled to a headband 22 by a pair of arms 24 and 26. The headband 22 includes a contoured front portion 28 made of a material such as plastic that has the structural integrity to support the arms 24, 26, the central support 18, display 14, camera 15 and optical element 16. A foam pad 30 or the like is disposed on an inner surface of the front portion 28 of the headband 22 so as to provide a cushion between the user's head and the front portion 28 of the headband 22. The headband 22 also includes an adjustable strap 32 that may be made of fabric, plastic or the like so as to secure the frame 12 about a user's head.

The central support 18 and thus the optical element 16 may be moved towards the user's face or away therefrom by an adjustable coupling 34, 36 that engages an outer portion of the respective arms 24, 26 extending through respective slots 38, 40 so as to adjustably mount the support 18 on the frame 12. The arms 24 and 26 may also be pivotally attached to the headband 22 by adjustable clamping members 46 and 48 so that the central support 18 can be raised and lowered.

Also mounted on the frame 12 is a speaker in the form of an earphone 27 and a microphone or boom 29 so as to allow two-way audio communication between the head mounted system 10 and the remote terminal 13. A housing 50 contains all or a portion of the controls for the head mounted communication system 10. The housing 50 is disposed adjacent one of the clamping members 48 on a side of the frame 12 that is opposite to the location of the display 14 and optical element 16 so as to act as a counterweight thereto.

The head mounted communication system 10 may receive data from a remote source such as the remote assistant's terminal 13 as discussed above and also from one or more non-remote data sources as well. For example, the head mounted system 10 may be coupled to a body worn user control module 208 that is preferably carried on the user's belt. The module 208 includes a number of key switches 210–216 for providing user input to the head mounted system 10. The key switches can also be used to control a cursor depicted on the display 14. Preferably the module 208 includes a CD ROM drive for reading a CD ROM, i.e. read only memory, containing data to be depicted on the display 14. The module 208 may also include batteries to provide power to the head mounted system 10. The circuitry within the module 208 can be connected to the circuitry of the head mounted system 10 via a cable 218. Alternatively, the head mounted system 10 can communicate with the non-remote module 208 using infra-red wireless communication technology or radio wireless communication technology.

As noted above, the housing 50 may contain only a portion of the controls for the head mounted communication system 10. Some of the controls for the head mounted system 10 may be contained in the module 208. Further, the module 208 and/or the housing 50 may include communication ports 220, 221 to allow the head mounted system to receive data from other non-remote sources such as an external peripheral device 222. An example of such a device is a sensor or measurement equipment operated by the user. The communication ports 220, 221 allow the head mounted system 10 to receive sensor or measurement data from the peripheral device 222 for display on the head mounted display 14.

The optical element 16 as shown in detail in the exploded perspective view of FIG. 2 has a solid body formed of a first prism 52 and a second prism 54. A lower surface 56 of the upper prism portion 52 is cut at a 45° angle with respect to a face 58 of the display 14. An upper surface 60 of the lower prism portion 54 of the optical element 16 has a 45° angle cut that is complimentary to the 45° cut of the upper prism portion 52 to allow the surfaces 56 and 60 to abut each other to form an optical element 16 having a solid body. A partially reflective coating 60 is formed in either the upper surface 60 of the lower prism 54 as shown in FIG. 2 or on the lower surface 56 of the upper prism portion 52 so as to form an internal partial reflector when the upper prism 52 is attached to the lower prism 54. The lower prism portion 54 has a focusing surface 62 that has a spherical shape to magnify the information depicted on the display 14. The focusing surface 62 has a central axis 64 that extends through a vertex of the surface 62 wherein the central axis 64 is coaxial with a central axis of the display 14, the central axis of the display 14 being perpendicular to the face 58 of the display 14. The central axis 64 of the focusing surface 62 is also perpendicular to the direct line of sight or see-through axis of the optical element 16. The focusing surface 62 of the lower prism 54 is made fully reflective so as to reflect an image of the information depicted on the face 58 of the display 14 to the partial reflector 60. The partial reflector 60 in turn reflects the image to an eye of the user. The user perceives an enlarged image of the displayed information as projected by the focusing surface 62 at a distance from the user that is greater than the optical path from the display to the user's eye through the optical element 16. Because the internal coating 60 is partially reflective, the image perceived by the user appears to be superimposed upon the real world. Further, since the central axis 64 of the focusing surface 62 having magnification power is perpendicular to the visual axis 20 along which the user looks to perceive the image, the portion of the real world viewed by the user through the optical element 16 is not distorted. This is extremely important when the head mounted display system is worn by a user who has to function in the real world.

In a preferred embodiment, the sides 66 and 68 of the optical element 16 as well as the bottom of the focusing surface 62 are covered with a black material or black coating that is extremely thin. The coating protects the optical element and the black color is such that the sides 66 and 68 seem to disappear so that they are not perceived by the user. The reflective coating 60 is preferably with in the range of 25% to 75% reflective whereas the focusing surface 62 of the optical element is made 100% reflective. The prisms 52 and 54 may be formed of a transparent material having an index of refraction of 1.00 to 1.78. One preferred material is polymethylmethacrylate (PMMA) having an index of approximately 1.49.

The camera system 15 includes a lens assembly and a photosensor array wherein the housing 31 functions to shroud ambient light from the photosensor array. The lens assembly is fixedly mounted in the housing 31 that also supports the photosensor array. The lens assembly is employed to focus an image of the field of view 33 of the camera system 15 onto the photosensor array. The photosensor array may be formed of an array of photodiodes or the like or preferably is formed of a charged-coupled device (CCD) array having a number of CCD pixel elements. The housing may also support an illumination assembly for illuminating the field of view of the camera system 15 so that the photosensor array can clearly capture the image within the sensor's field of view 33. The individual elements of the photosensor array are responsive to incident light so as to provide an output signal in the form of a gray level signal that represents the magnitude of the incident light. A suitable camera system may include a Model CCB-X series camera from Sony Corp.

Figure 3:
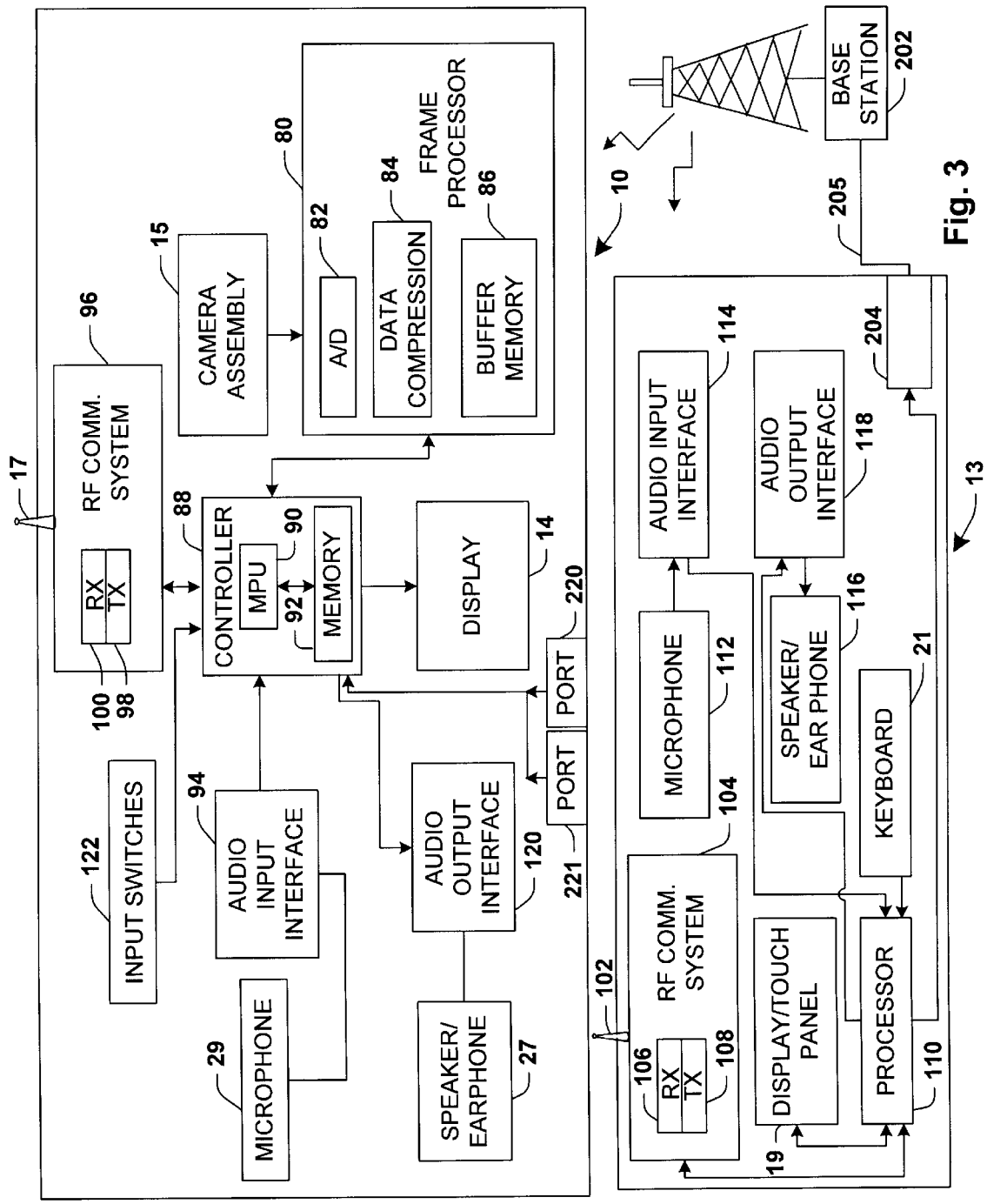
FIG. 3 is a block diagram illustrating the controls of the head mounted communication system and the remote assistant's terminal.

As shown in FIG. 3, the camera assembly 15 is coupled to a frame grabber or processor 80 so as to process one frame of an image captured by the camera 15 at a time. More particularly, the gray level signals from the photosensor array of the camera system 15 are coupled to an analog to digital converter 82 to provide a digital representation of one image frame. The digital image data for a frame is compressed by a video compression chip 84 and thereafter temporarily stored in a buffer memory 86. A controller 88 that includes a microprocessor 90 and associated memory 92 retrieves a frame of video data from the memory 86. The controller 88 also retrieves any audio data that is present from an audio input interface 94 coupled to the microphone 29 to convert analog audio signals to digital audio signals. The microprocessor 88 couples the data to be transmitted, i.e. the retrieved video and audio data, to a radio frequency communication system 96. The radio system 96 in turn formats the data coupled thereto so that it can be transmitted via an antenna 17 as a radio frequency signal to the remote assistant's terminal 13. It is noted however that wireless communication systems other than radio systems can be used with the present invention. For example, infra-red transmitters and receivers may also be used.

When a radio system is employed to provide wireless communication with the remote terminal 13, the radio system 96 formats the data in packets. Each packet includes a synchronization portion, a header portion, an information portion and an error checking portion. The synchronization portion of the signal is a fixed data pattern that allows a receiver to synchronize to the phase of the transmitted signal. The header portion of the signal includes an address or code identifying the particular terminal 13 to which the signal is intended to be sent as well as an address or code identifying the particular head mounted communication system 10 that is transmitting the signal. The information portion of the signal includes at least a portion of the total data intended to be transferred from the head mounted system 10 to the terminal 13. If the amount of data to be transmitted exceeds the maximum length allowed for the particular radio frequency protocol employed, the data is transmitted in a plurality of sequential packets, each packet including a synchronization portion, header portion and error checking portion as well as the information portion.

The systems 10 and 13 communicate with each other via a radio frequency network 200. The network 200 includes a plurality of base stations 202, 203, each having a transmitter and receiver for communicating with wireless devices within the station's range or cell. The base stations are typically coupled to each other by a high speed network backbone 205 such as Ethernet or TokenRing. While the head mounted system 10 is preferably a wireless device that accesses the network backbone 205 via a base station 202, 203, the remote system 13 can likewise be wireless or it can be wired to the network backbone 205 via a port 204 or the like. The radio network 200 utilized in conjunction with the systems 10 and 13 is preferable such as to have the necessary bandwidth to transfer the compressed video image frames and compressed voice data quickly enough to appear as real time to the user of the system 10 and the operator of the terminal 13. One such network is the Arlan Direct Sequence Spread Spectrum local area network system available from Aironet Wireless Communications of Akron, Ohio. The radio communication system 96 employed with the network includes a transceiver or a transmitter 98 for transmitting radio frequency signals and a receiver 100 for receiving radio frequency signals. A suitable radio system 96 is the Aironet remote radio model 024. Alternatively, a nationwide network such as RAM, ARTIS, CDPD (Cellular Digital Packet Data) or a combination of networks interlinking the head mounted system 10 with the remote system 13 may be employed.

The remote assistant's terminal 13 similarly includes a radio frequency communication system 104 with a receiver 106 and transmitter 108 capable of operating on the designated communication network. The radio communication system 104 is coupled to a processor 110 that controls the information depicted on the display 19 so that the video images received from the head mounted system are depicted on the display 19, preferably in real time. The processor is also coupled to a speaker/earphone 116 via an audio output interface 118 so as to provide any received audio to the operator of the terminal 13.

As the operator of the terminal 13 is viewing the images received from the head mounted display system, the operator may wish to provide visual input to the user of the head mounted system 10. As discussed above, the operator of the terminal 13 provides such input via the keyboard 21 and or the stylus 23 associated with the touch panel of the display 19. Once the operator of the terminal 13 is finished inputting the information he wishes to transmit back to the head mounted unit, the operator may signal the processor 110 that he wishes to transmit particular information by entering an associated transmit command via the keyboard 21. The processor 110 as described below is responsive to such a command to couple the data to be transmitted to either the port 204 or to the radio system 104. When the radio system 104 receives data to be transmitted, it formats the data for transmission back to the head mounted system 10. The processor 110 may also continuously couple the data back to the head mounted system 10 such that it appears on the display 14 in essentially real time.

Upon receipt of a radio frequency signal, the radio system 96 of the head mounted system 10 compares the destination identity code contained within the header portion of the received signal to the unit's own identity code stored in the memory 92 or in a memory of the radio system 96 to determine if there is a match. If there is a match the radio system 96 determines that the received signal was intended for the particular head mounted system 10 and the system 96 couples the received data to the controller 88. The controller 88 then retrieves the video and/or audio data contained within the received signal for processing. The controller 88 controls the display 14 to depict the retrieved video and further controls an audio output interface 120 and speaker 27 to generate audio from the retrieved audio data.

The system 10 may include user operable input switches 122, keys or the like so as to allow the user to provide various input commands to the controller 88. One such command may include a freeze frame command wherein the user selects a single frame of video information captured by the camera 15 and depicted on the display 14 to be transmitted to an intended remote assistant's terminal 13. The remote assistant's terminal 13 may also be responsive to a freeze frame command entered by the operator via the keyboard 21 so as to select one particular image to be transmitted to the head mounted system 10. It is noted that the transfer of individual "freeze frames" of video need not be done in real time.

If the user of the head mounted system 10 maintains his head position stationary, the images picked up by the camera assembly 15 in successive frames and transmitted to the remote assistant's terminal 13 for display in real time on the touch panel display 19 will remain unchanged The assistant can add marks, icons, text or graphics to the picked up image depicted on the display 19 so as to identify, for example, a particular object within the picked up image. These inputs by the assistant or operator of the terminal 13 can be transmitted back to the user of the head mounted system 10 with information identifying the location of the marks with respect to the picked up image as depicted on the display 19. Because the image projected by the display 14 and optics 16 of the head mounted system 10 is at a known location with respect to the image of the real world 33 picked up by the camera system 15, the projected image and picked up image can be correlated. Thus, data representing the marks input by the operator at the remote terminal 13, when transmitted in association with information representing the location of the marks with respect to the picked up image shown on the display 19, can be processed by the controller 88 to offset the marks represented by the received data so that when projected by the optics 16, the marks identify the same real world objects viewed through the optics 16 as the real world objects identified by the marks on the remote terminal's display 19. This process is, however, dependent on the user of the head mounted system 10 maintaining his head stationary or realigning his head so that the currently picked up image is the same as the image marked at the remote terminal 13.

In accordance with another mode of operation, the operator of the terminal 13 may enter freeze frame and transmit commands via the keyboard 21 after he has finished marking or adding inputs to the picked up image shown on the display 19. The processor 110 responds thereto by transmitting data representing a single frame of displayed information i.e. data representing all of the information depicted on the display 19. This information, may include for example the picked up image received from the head mounted system with the additional inputs or marks added by the operator of the terminal 13. When video data that includes the picked up image and the additional inputs made by the operator at the terminal 13 is displayed on the display 14 of the head mounted system 10, the picked up image with additional marks will be projected so that it appears at a distance from the user. If desired, the user can position his head so that the projected image, representing an image of the real world picked up by the camera 15 and marked at the terminal 13, is in alignment or coincides with the real world as viewed through the semitransparent optical element 16.

Figures 4, 5:
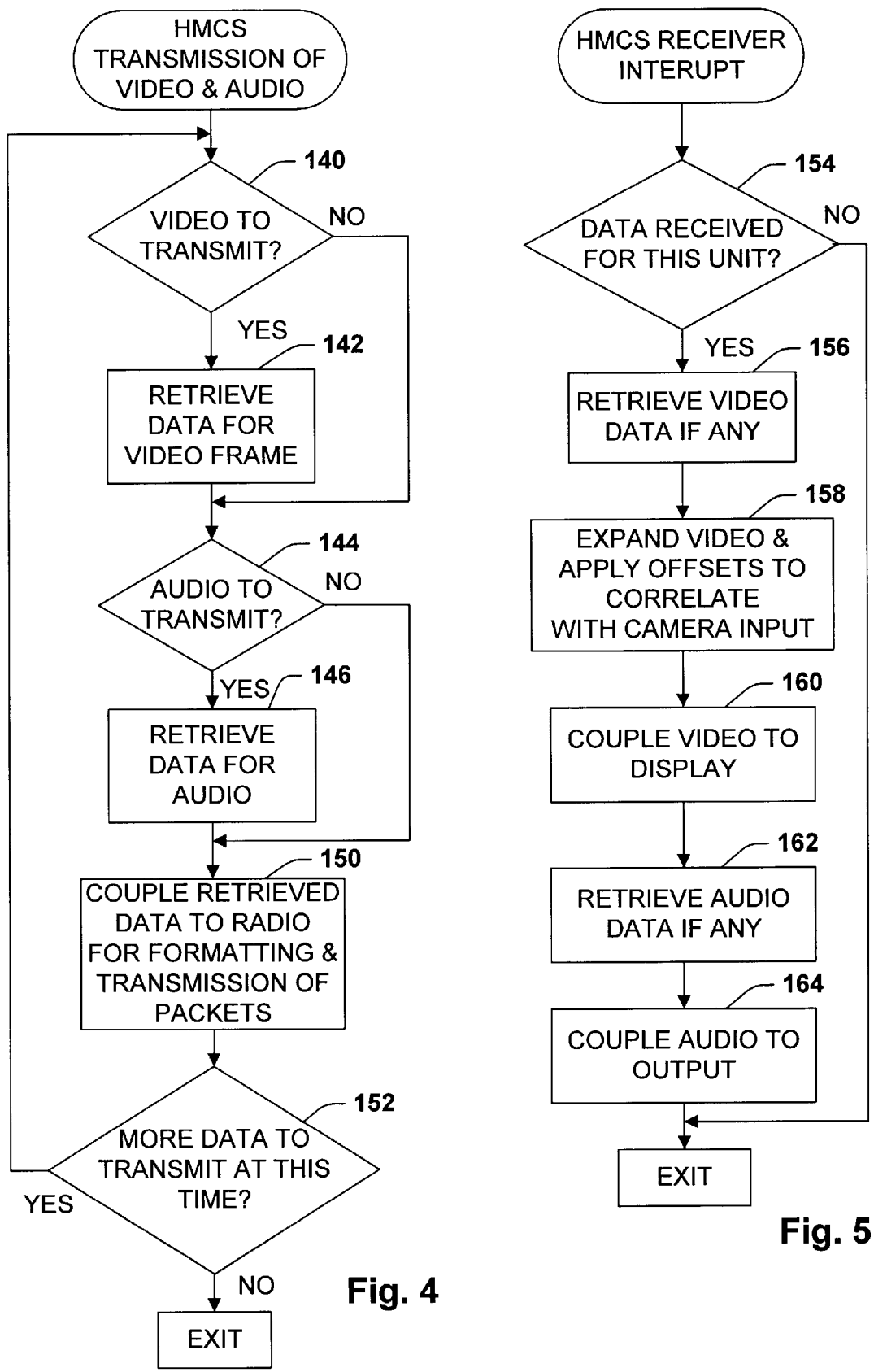
FIG. 4 is a flow chart illustrating the operation of the head mounted communication system for the transmission of video and/or audio data.
FIG. 5 is a flow chart illustrating the operation of the head mounted communication system for the processing of data received from the remote assistant's terminal.

The head mounted communication system 10 operates to transmit video and/or audio data to a remote assistant's terminal 13 in accordance with the flow chart depicted in FIG. 4. At a block 140, the microprocessor 90 determines whether there is a frame of compressed video data in the buffer memory 86 to be transmitted. If so, the microprocessor 90 proceeds to block 142 to retrieve the compressed data for a video frame. Thereafter, at a block 144, the microprocessor 90 determines whether there is audio data to be transmitted and if so, the microprocessor at a block 146 retrieves the digital audio data from the interface 94. At block 150, the microprocessor 90 couples the retrieved video and audio information to the radio 96 for formatting of the data with header information for transmission to a remote system 13. At a block 152, the microprocessor 90 determines whether there is more data to be transmitted at this time and if so, the microprocessor proceeds back to block 140. As discussed above, the microprocessor 90 can operate in accordance with the flow chart of FIG. 4 to control the continuous transmission of frame images to the remote terminal 13 so that the operator at the terminal 13 obtains a real time view of what the user of the head mounted system 10 is seeing. Alternatively, the microprocessor 90 can operate in accordance with this flow chart so as to be responsive to a user actuated input via one or more switches 122 to transmit only a single selected frame image, as depicted on the display 14, to the remote terminal 13. In this mode, the user can determine exactly what is being sent to the remote terminal at a given instant.

The transmission of video and/or audio digital signals to the remote system 13 can be interrupted by the receipt of a radio frequency signal from the remote terminal 13. In such an event, the microprocessor 90 operates in accordance with the flow chart depicted in FIG. 5. At a block 154, the microprocessor 90 determines that the radio 96 has received a signal that was intended for receipt by the particular unit 10 and begins the processing of the information coupled to the controller 88 from the radio 96. In particular, the microprocessor proceeds to block 156 to retrieve from the received information the video data portion thereof if any. Thereafter, the microprocessor proceeds to block 158 to expand the video data and to apply the necessary offsets so that when the video is depicted on the user's display 14, it will be correlated to or coincide with at least a portion of the image picked up by the camera system 15. Thus, if the assistant's terminal transmits only information input by the operator of the terminal 13 and the location thereof with respect to the picked up image depicted on the display 19, the microprocessor 90 will control the display 14 so that the marks appear to identify or are in association with the same real world objects viewed through the semitransparent optical element 16 as the real world objects depicted in the picked up image on the display 19 when marked.

It is noted that if the remote terminal 13 transmits the entire image depicted on the display 19, the step of applying offsets and correlating the received data so that it is depicted on the display 14 in correlation with the camera system 15 may be omitted. Further, if the head mounted display system is coupled to the non-remote module 208 or to non-remote peripheral equipment 222 via a port 220, 221 so as to receive data therefrom for display, at block 160 the microprocessor 90 is responsive to inputs from the key switches 210–216 to control the display 14 to depict information representing data received from the non-remote data source(s) 208, 222 and from the remote source 13 individually or simultaneously. In order to display the data from a number of different sources simultaneously, the microprocessor 90 divides the display into a number of zones, zone I, zone II, zone III etc., wherein each zone depicts data from a different source. For example, zone I may depict information representing data retrieved from the read only memory of the module 208; zone II may depict information representing data received from the remote system 13; and zone III may display real-time measurements or stored information from external testing equipment 222. The microprocessor is responsive to the user actuated key switches 210–216 to selectively modify the size, position and shape of each zone and to eliminate a zone from the display 14.

After processing the data to be displayed, the microprocessor 90 proceeds to block 162 to retrieve audio data from the received signal. The retrieved audio data is coupled to the audio output interface 120 where it is converted to an analog signal applied to the speaker/earphone 27. Thus, the system of the present invention allows the user to receive real-time or stored video data and/or audio data from a remote system 13 and to also receive real-time and/or stored data from one or more non-remote sources wherein the received information is presented to the user in an integrated manner while the user simultaneously views and operates in the real world.

Figure 6:
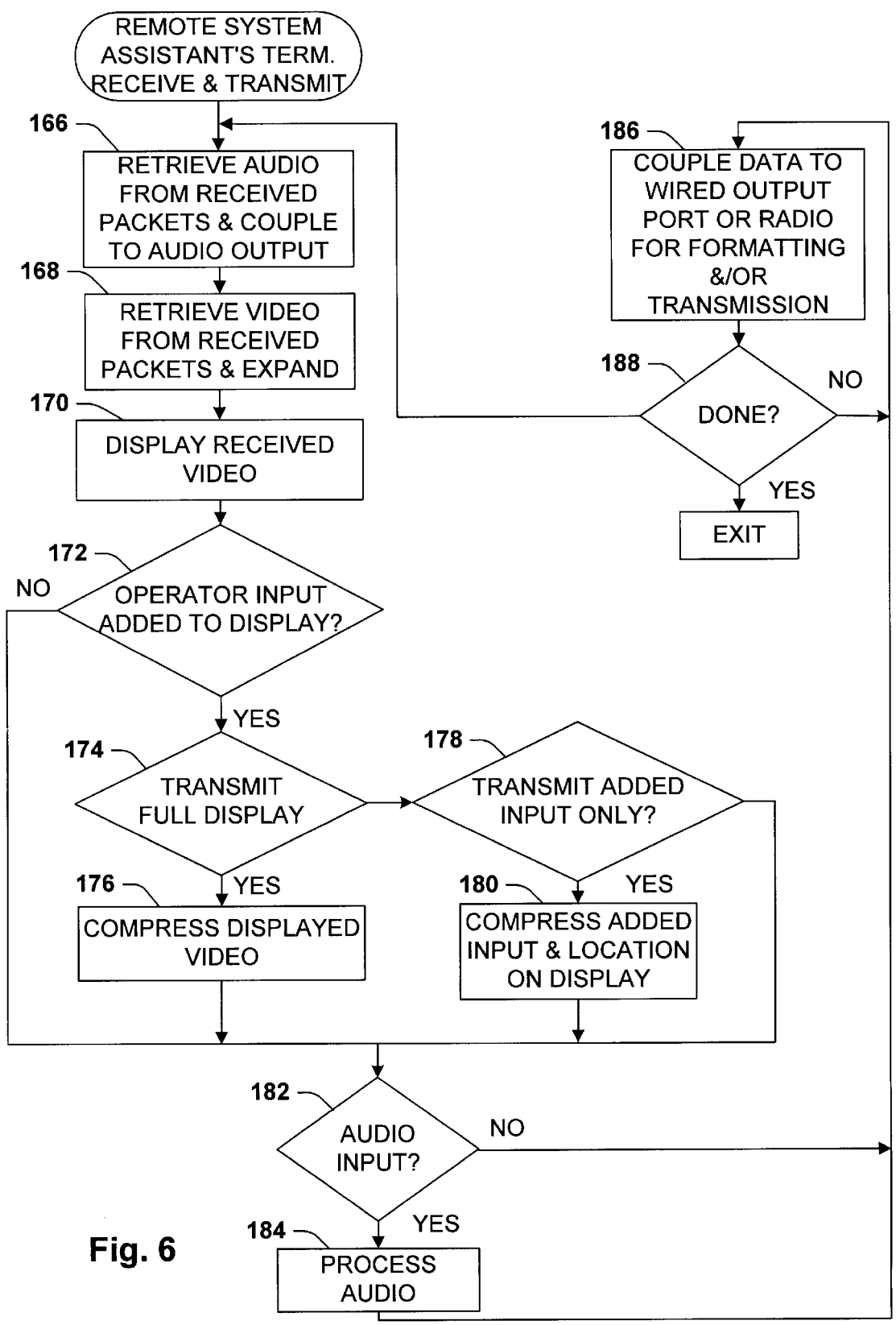
FIG. 6 is a flow chart illustrating a remote assistant's terminal receive and transmit routine.
Figure 7:
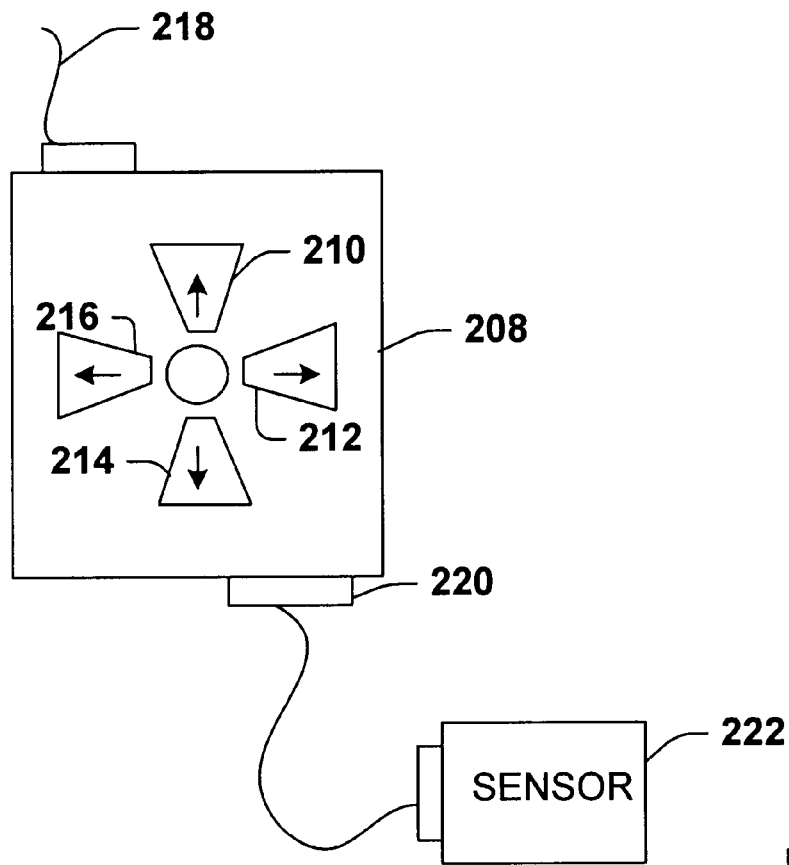
FIG. 7 is a front view of a body worn CD ROM drive with cursor control keys.
Figure 8:
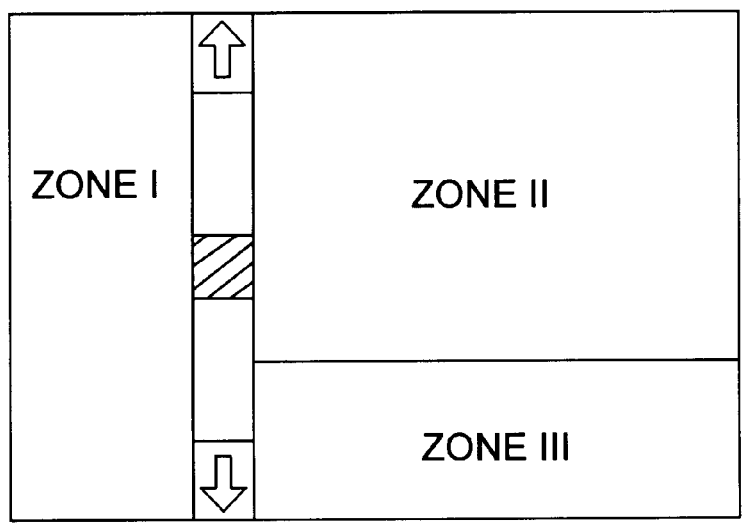
FIG. 8 is a front view of a screen depicted on the display of the head mounted communication system.

The processor 110 of the remote assistant's terminal 13 operates in accordance with the flow chart depicted in FIG. 6 to receive and transmit video and audio data. At a block 166, the processor 110 retrieves audio data, if any, from one or more received packets and couples the retrieved audio data to an audio output interface 118. The audio output interface 118 converts the digital audio data to analog data that is coupled to a speaker 116. At block 168 the processor 110 retrieves the video data from the received packets and expands the video data. The retrieved video data is then coupled by the processor 110 to the display 19 at block 170. Thereafter, at block 172 the processor 110 determines whether the operator of the terminal 13 has added an input to the display 19 via either the keyboard 21 or the stylus 23 and touch panel of the display 19. If the operator has added information to the display 19, the processor 110 proceeds to block 174 to determine whether the full display of video information is to be transmitted back to the head mounted system 10. If so, the processor 110 proceeds to block 176 to compress the data representing the image depicted on the display 19. If the processor determines at block 174 that the full display is not to be transmitted, the processor 110 proceeds to block 178 to determine whether only the inputs added by the operator are to be transmitted. If so, the processor 110 proceeds to block 180 to compress the data representing the added input with data identifying the location of the added input on the display, i.e. the location of the added input with respect to the picked up image shown on the display 19. It is noted that the full display of information includes both the picked up image and the information added by the operator and shown on the display 19. Thus, the processor 110 obtains this data directly from the display's image buffer or memory for compression at block 176. If only the operator's input added via the stylus 23 is to be transmitted, the processor 110 can obtain data representing only this input directly from the touch panel and associated touch panel circuitry since the information is directly available therefrom. Once the video information to be transmitted has been compressed, the processor 110 proceeds to block 182 to determine whether the operator of the terminal 13 has provided any audio input. If so, the processor 110 proceeds to block 184 to process the audio input for transmission by compressing the digital audio signals received from the audio input interface 114. From either of blocks 182 or 184, the processor 110 proceeds to block 186. At block 186, the processor 110 couples the compressed data to the radio 104 for formatting and transmission. Thereafter, the processor 110 determines whether more information is to be processed and if so, the processor returns to block 166.

It is noted that many modifications can be made to the head mounted communication system and remote system described herein without departing from the invention. For example, the remote system 13 may be wired to a distinct station that controls the formatting and transmission of information to the head mounted system via a network 200. Optics different from the optics 16 depicted in FIGS. 1 and 2 may be utilized for the head mounted system 10. The electronics contained in the housing 50 may be split between the housing 50 mounted on the frame 12 and an auxiliary unit that is either preferably body-worn or hand-held. Many other modifications and variations of the present invention are also possible in light of the above teachings. Thus, it is to be understood that, within the scope of the appended claims, the invention may be practices otherwise than as described hereinabove.

What is claimed and desired to be secured by Letters Patent is:

1. A head mounted communication system for providing visual communications between a user of the head mounted system and a remote system having a display and being capable of receiving data from said head mounted system and transmitting data to said head mounted system, comprising:

a support to be worn on a user's head;

a camera system mounted on said support to pick up an image within at least a portion of the user's field of view and to provide digital signals representative of said image;

a display mounted on said support for displaying information;

optics mounted on said support relative to said display for projecting an enlarged image of said displayed information at a distance from the user;

a transmitter for wireless transmission of data to said remote system;

a receiver for wireless reception of data from said remote system; and a controller responsive to digital signals representing an image picked up by said camera system for controlling the transmission, to said remote system, of data representing said picked up image for display of said image on said remote system display, said controller being responsive to the receipt of data from said remote system representing said picked up image modified with additional information superimposed thereon for controlling said display to display said modified image for projection by said optics.

2. A head mounted communication system as recited in claim 1 wherein said optics include a partial reflector viewed by said user to perceive said enlarged image superimposed on the user's view of the real world.

3. A head mounted communication system as recited in claim 1 wherein said optics include a monocular reflective element viewed by the user to perceive said enlarged image superimposed on the user's view of the real world.

4. A head mounted communication system as recited in claim 1 wherein said transmitter and receiver communicate with said remote system via a radio network including a plurality of base stations.

5. A head mounted communication system as recited in claim 1 wherein said camera system includes a charged coupled device photosensor array.

6. A head mounted communication system as recited in claim 1 wherein said controller formats data for transmission in one or more sequential packets including header information containing an identity of the remote system for which the transmitted data is intended and an identity of the head mounted system.

7. A head mounted communication system as recited in claim 1 further including at least one speaker mounted on said support; and an audio pick up device mounted on said support to pick up verbal communications from the user and to provide digital signals representative thereof, said controller being responsive to said digital signals representing picked up audio to control the transmission thereof to said remote system and being responsive to the receipt of audio data by said receiver to couple said audio data to said speaker.

8. A head mounted communication system as recited in claim 1 including an input device actuable by the user for providing a user input command; and a read only memory for storing data representing selectable information for display, said controller being responsive to a user input command for controlling said display to display selected information represented by data stored in said read only memory and said modified image.

9. A head mounted communication system as recited in claim 8 wherein said controller is responsive to a user input command for controlling the locations at which the information from said read only memory and said modified image are displayed.

10. A head mounted communication system as recited in claim 1 including an input device actuable by the user for providing a user input command; and a port for wired connection to at least one of a plurality of external sensing devices to receive data therefrom representing displayable measurement information, said controller being responsive to a user input command for controlling said display to display selected information represented by data from said port with said modified image.

11. A head mounted communication system as recited in claim 10 wherein said controller is responsive to a user input command for controlling the locations at which the information from said port and said modified image are displayed.

12. A head mounted communication system for providing visual communications between a user of the head mounted communication system and a remote system having a display and input device for controlling information input on said display and being capable of receiving data from said head mounted communication system comprising:

a support to be worn on a user's head;

a camera system mounted on said support to pick up an image within at least a portion of the user's field of view;

a user's display mounted on said support for displaying information;

optics mounted on said support relative to said display including a partially reflective element into which the user looks to view an enlarged image of said display information projected by said element so as to be superimposed upon the real world, wherein the real world image picked up by said camera is correlatable to the real world image viewed by said user through said partially reflective element;

a transmitter for wireless transmission of data to said remote system;

a receiver for wireless reception of data from said remote system; and a controller responsive to said camera system for controlling the transmission, to said remote system, of data representing said picked up image for display of said image on said remote system display, said controller being responsive to the receipt of data from said remote system, said data representing information input at said remote system at an identifiable location on the remote system display with respect to said picked up image, for controlling said user's display to display said input information at a location correlated with said identifiable location.

13. A head mounted communication system as recited in claim 12 wherein said data received from said remote system includes information representing said identifiable location.

14. A head mounted communication system as recited in claim 12 wherein said controller operates to transmit a plurality of frames of image data picked up by said camera system substantially continuously so as to provide a real time representation of said portion of the user's field of view picked up by said camera.

15. A head mounted communication system as recited in claim 12 wherein said controller is responsive to an input from the user to transmit data representing only a selected frame of an image picked up by said camera.

16. A head mounted communication system as recited in claim 12 wherein said transmitter and receiver communicate with said remote system via a radio network including a plurality of base stations.

17. A head mounted communication system as recited in claim 12 wherein said controller formats data for transmission in one or more sequential packets including header information containing an identity of the remote system for which the transmitted data is intended and an identity of the head mounted system.

18. A head mounted communication system as recited in claim 12 further including at least one speaker mounted on said support; and an audio pick up device mounted on said support to pick up verbal communications from the user and to provide digital signals representative thereof, said controller being responsive to said digital signals representing picked up audio to control the transmission thereof to said remote system and being responsive to the receipt of audio data by said receiver to couple said audio data to said speaker.

19. A head mounted communication system for providing visual communications between a user of the head mounted communication system and a remote system having a display and input device and being capable of receiving data from said head mounted communication system and transmitting data to said head mounted communication system comprising:

a support to be worn on a user's head;

a camera system mounted on said support to pick up an image within at least a portion of the user's field of view and to provide digital signals representative of said image;

an image generating and projection system mounted on said support for generating visual information and for projecting said information at a distance from the user;

a transmitter for wireless transmission of data to said remote system;

a receiver for wireless reception of data from said remote system; and a controller responsive to digital signals representing an image picked up by said camera system for controlling the transmission of data representing said picked up image to said remote system for display of said image on said remote system display, said controller being responsive to the receipt of video data from said remote system representing at least in part, additional information input at the remote system in spatial relation to objects within said picked up image as displayed on said remote system display, and for controlling the image generating and projection system to generate a visual representation of said additional information for projection thereof in said spatial relation to said objects within said picked up image.

20. A head mounted communication system as recited in claim 19 wherein said image generating and projection system includes a liquid crystal display.

21. A head mounted communication system as recited in claim 19 wherein said image generating and projection system includes a partial reflector viewed by said user to perceive said projected information so as to be superimposed on the real world.

22. A head mounted communication system for providing visual and audio communications between a user of the head mounted communication system and a remote system having a display and being capable of receiving data from said head mounted communication system and transmitting data to said head mounted communication system comprising:

a support to be worn on a user's head;

a camera system mounted on said support to pick up an image within at least a portion of the user's field of view;

an image generating and projection system mounted on said support for generating visual information and for projecting said information at a distance from the user;

at least one speaker mounted on said support;

an audio pick up device mounted on said support to pick up verbal communications from the user;

a transmitter for wireless transmission of data to said remote system;

a receiver for wireless reception of data from said remote system; and a controller responsive to said camera system for controlling the transmission, to said remote system, of data representing an image picked up by said camera system and responsive to the receipt of audio and visual feedback information for respectively controlling said speaker and said image generating and projection system to provide said audio and visual feedback information to said user, said visual feedback information including modifications to said picked up image as input at said remote system in correspondence with objects in said picked up image and wherein the image generating and projection system presents a display of said modifications in relation to said objects in said picked up image.

23. A head mounted communication system as recited in claim 22 wherein said image generating and projection system includes a liquid crystal display.

24. A head mounted communication system as recited in claim 22 wherein said image generating and projection system includes a partial reflector viewed by said user to perceive said projected information.

25. A head mounted communication system as recited in claim 22 wherein said controller formats data for transmission in one or more sequential packets including header information containing an identity of the remote system for which the transmitted data is intended and an identity of the head mounted system.

26. A head mounted communication system as recited in claim 22 including an input device actuable by the user for providing a user input command; and a read only memory for storing data representing selectable information for display, said controller being responsive to a user input command for controlling said display to display selected information represented by data stored in said read only memory and said modified image.

27. A head mounted communication system as recited in claim 26 wherein said controller is responsive to a user input command for controlling the locations at which the information from said read only memory and said modified image are displayed.

28. A head mounted communication system as recited in claim 22 including an input device actuable by the user for providing a user input command; and a port for wired connection to at least one of a plurality of external sensing devices to receive data therefrom representing displayable measurement information, said controller being responsive to a user input command for controlling said display to display selected information represented by data from said port with said modified image.

29. A head mounted communication system as recited in claim 28 wherein said controller is responsive to a user input command for controlling the locations at which the information from said port and said modified image are displayed.

30. A head mounted communication system for providing visual communications between a user of the head mounted system and a remote system comprising:
 a support to be worn on a user's head;
 a display mounted on said support for displaying information;
 optics mounted on said support relative to said display for projecting an enlarged image of said displayed information;
 a plurality of sources of data representing displayable information including:
  a camera system to pick up an image within the field of view thereof and to provide data representative of said picked up image;
  a wireless communication system with a receiver for receiving data representing displayable information from said remote system;
  a read only memory for storing data representing selectable information for display;
  a port for a wired connection to at least one of a plurality of external sensing devices to receive data therefrom representing displayable measurement information;
 an input device actuable by the user for providing a user input command; and
 a controller coupled to said plurality of data sources and responsive to a user input command for controlling said display to selectively display information represented by data received from said plurality of data sources.

31. A head mounted display communication system as recited in claim 30 wherein said controller is responsive to a user input command for controlling said display to simultaneously display information represented by data received from two or more of said data source.

32. A head mounted communication system as recited in claim 31 wherein said controller is responsive to a user input command for controlling the location at which the information from said two or more data sources is depicted on said display.

33. A head mounted communication system as recited in claim 30 wherein said input device includes at least one switch for positioning a cursor depicted on said display under the control of the controller.

34. A head mounted communication system for providing visual communications between a user of the head mounted system and a remote system comprising:
 a support to be worn on a user's head;
 a display mounted on said support for displaying information;
 optics mounted on said support relative to said display for projecting an enlarged image of said displayed information;
 a wireless communication system with a receiver for receiving, from said remote system, data representing displayable information from said remote system;
 a plurality of non-remote sources of data representing displayable information;
 an input device actuable by the user for providing a user input command for selecting display information represented by data received from said wireless communication system and said plurality of data sources; and
 a controller for receiving data from said wireless communication system and said plurality of data sources and responsive to a user input command for controlling said display to selectively display information represented by data received from said wireless communication system and one or more of said data sources simultaneously or individually in accordance with said user input command.

35. A head mounted communication system as recited in claim 34 wherein one of said non-remote sources of data includes a camera system to pick up an image within the field of view thereof and to provide data representative of said picked up image.

36. A head mounted communication system as recited in claim 34 wherein one of said non-remote sources of data includes a read only memory for storing data representing selectable information for display.

37. A head mounted communication system as recited in claim 34 wherein one of said non-remote sources of data includes a port for a wired connection to at least one of a plurality of external sensing devices to receive data therefrom representing displayable measurement information.

38. A method of controlling a head mounted communication system having a display for displaying information, optics for projecting an enlarged image of displayed information at a distance from the user, a wireless communication device for transmitting and receiving data, a camera for capturing images, and a support to be worn on a user's head, said display, optics, communication device and camera being mounted on said support comprising:

operating said camera to capture an image within at least a portion of a user's field of view and to provide image data representative of the captured image;

digitizing a frame of captured image data to provide a frame of digital image data;

compressing said frame of digital image data;

formatting said frame of compressed digital image data for transmission in one or more sequential packets, each of said packets including an identity of said head mounted system and an identity of a remote system for which said data is intended to be transmitted;

transmitting said one or more sequential packets to said remote system; and further comprising the step of displaying a plurality of frames of images captured by said camera; and formatting and transmitting only a user selected frame of a captured image.

39. A method of controlling a head mounted communication system as recited in claim 38 wherein said steps of operating said camera, digitizing a frame of data, and compressing, formatting and transmitting said data are performed substantially continuously until interrupted so as to transmit to said remote station real time images falling within said portion of the user's field of view.

40. A method of controlling a head mounted communication system as recited in claim 38 including the steps of receiving a signal transmitted from said remote system to said head mounted system, said signal including data representing an image;

retrieving said image data from said received signal; and controlling said display to display the image represented by said data.

41. A method of controlling a head mounted communication system as recited in claim 40 further including the steps of receiving data from a non-remote data source; and displaying data received from said non-remote data source with said image represented by data from said remote system.

42. A method of controlling a head mounted communication system as recited in claim 40 wherein said data includes information identifying a location of the image from the remote system with respect to an image captured by said camera and said display control step includes correlating said identified location with a location on said display.

43. A method of controlling a head mounted communication system as recited in claim 38 wherein said head mounted communication system includes a speaker and a microphone for picking up audio and further including the steps of transmitting in real time audio picked up from said microphone; receiving data representing audio transmitted from said remote system; and coupling said audio to said speaker to provide two way real time audio communications.

* * * * *